(12) United States Patent
Kishimoto et al.

(10) Patent No.: US 6,836,608 B2
(45) Date of Patent: Dec. 28, 2004

(54) PLANAR OPTICAL WAVEGUIDE, METHOD FOR MANUFACTURING THE SAME AND POLYMER OPTICAL WAVEGUIDE

(75) Inventors: Yoshio Kishimoto, Hirakata (JP); Masahiro Mitsuda, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 166 days.

(21) Appl. No.: 10/026,806

(22) Filed: Dec. 27, 2001

(65) Prior Publication Data

US 2002/0085825 A1 Jul. 4, 2002

(30) Foreign Application Priority Data

Dec. 28, 2000 (JP) ........................................ 2000-400398
Dec. 28, 2000 (JP) ........................................ 2000-400399

(51) Int. Cl.⁷ .............................................. G02B 6/10
(52) U.S. Cl. .................... 385/130; 385/122; 385/124; 385/129; 385/131; 385/132; 385/141; 385/142; 65/385; 438/31
(58) Field of Search ................................. 385/122, 124, 385/129–132, 141, 142; 65/385; 438/31

(56) References Cited

U.S. PATENT DOCUMENTS

| | | | |
|---|---|---|---|
| 4,838,634 A | | 6/1989 | Bennion et al. ......... 350/96.12 |
| 4,871,221 A | * | 10/1989 | Imoto ....................... 385/130 |
| 5,054,872 A | * | 10/1991 | Fan et al. .................. 385/130 |
| 5,206,925 A | * | 4/1993 | Nakazawa et al. .......... 385/142 |
| 5,291,574 A | * | 3/1994 | Levenson et al. ........... 385/129 |
| 5,556,442 A | * | 9/1996 | Kanamori et al. ........... 65/17.4 |
| 5,690,863 A | | 11/1997 | Schuman .................... 252/582 |
| 6,393,185 B1 | * | 5/2002 | Deacon ....................... 385/50 |
| 6,650,818 B2 | * | 11/2003 | Gao .......................... 385/132 |
| 6,687,446 B2 | * | 2/2004 | Arakawa ..................... 385/129 |
| 6,690,871 B2 | * | 2/2004 | Lee et al. ................... 385/129 |
| 2001/0007606 A1 | * | 7/2001 | Sasaki et al. ............... 385/129 |
| 2004/0008968 A1 | * | 1/2004 | Lee et al. ................... 385/142 |

FOREIGN PATENT DOCUMENTS

| JP | 08-264748 | 10/1996 | ........... H01L/27/15 |
|---|---|---|---|
| JP | 09-251113 | 9/1997 | ............ G02B/6/13 |

* cited by examiner

Primary Examiner—Brian Healy
Assistant Examiner—Daniel Petkovsek
(74) Attorney, Agent, or Firm—McDermott Will & Emery LLP

(57) ABSTRACT

A planar optical waveguide includes a layered film formed on a substrate, and an optical waveguide core formed in the layered film. A cross section of the optical waveguide core is substantially quadrilateral, and a dopant layer including refractive index-lowering molecules is provided around the optical waveguide core. The refractive index-lowering molecules included in the dopant layer are unevenly distributed in the optical waveguide core with a concentration that is higher toward outer sides and corners of the optical waveguide core, whereby a graded-index optical waveguide is constituted.

9 Claims, 8 Drawing Sheets

PLANAR OPTICAL WAVEGUIDE, METHOD FOR MANUFACTURING THE SAME AND POLYMER OPTICAL WAVEGUIDE

BACKGROUND OF THE INVENTION

The present invention relates to planar optical waveguides used for optical communication, optical information processing or the like, and to methods for manufacturing the same. In particular, the present invention relates to planar optical waveguides made of polymer material and to methods for manufacturing the same.

As the technology of optical information processing advances and optical communication systems are put into practice, there is a need for the development of a variety of components for optical communications, such as optical transmission lines, semiconductor lasers and photodetectors. Of these, optical transmission lines transmitting optical signals are especially important, and necessary requirements are that the optical losses are small, and manufacturing is easy.

As optical transmission lines, there are quartz-based optical transmission lines, which are based on quartz, and organic polymer optical transmission lines, which are based on an organic polymer material. Among these, even though in optical transmission lines having a planar optical waveguide that is organic polymer based (polymer waveguide), the transparency, heat resistance and performance are poorer than that of quartz-based transmission lines, their flexibility is excellent and they can be easily formed into transparent films, and they are promising with regard to their low number of manufacturing steps, their low cost, etc.

As the material for polymer optical waveguides, many polymer materials, from fluorinating polyimides to polymethylmethacrylate, silicone resins and epoxy resins, have been disclosed, for example in Japanese Laid-Open Publication No. 09-251113, or by Shin Hikida, Saburo Imamura in "DENSHI ZAIRYO", page 32, Feb. 1996 issue, and by Tohru Maruno in "OYO BUTURI", vol. 68, $1^{st}$ issue (1999) among others.

Referring to FIGS. 8A and 8B, the following is an explanation of a conventional polymer-based planar optical waveguide. FIGS. 8A and 8B schematically show the cross-sectional structure of the planar optical waveguide.

In the conventional planar optical waveguide shown in FIG. 8A, a lower cladding layer 200 having a groove with quadrilateral cross section is formed on a substrate 100, and a core layer 300 made of an organic polymer material is filled into this groove. Furthermore, an upper cladding layer 400 is formed such that it completely covers the core layer 300.

In an alternative conventional planar optical waveguide as shown in FIG. 8B, a lower cladding layer 201 is formed on a substrate 101, a core layer 301 made of an organic material with a quadrilateral cross section is formed on the lower cladding layer 201, and an upper cladding layer 401 is formed such that it completely buries the core layer 301.

If the cross section of the core layers 300 and 301 is quadrilateral as in these conventional optical waveguides, there is the possibility that the optical path length of the light guided by reflection along the optical waveguide becomes longer than necessary. Furthermore, optical transmission losses and distortions occur at the boundaries between the different sides of the quadrilateral. Therefore, it is desirable that the cross-sectional shape of the core layer is circular.

However, in conventional planar optical waveguides, the cross-sectional shape of the core layer is quadrilateral due to manufacturing considerations. In the approach shown in FIG. 8A, the groove of the lower cladding layer 200 is formed by etching, so that the cross-sectional shape of the core layer 300 becomes quadrilateral. Similarly, also in the approach shown in FIG. 8B, the core layer 301 itself is formed by etching, so that the cross-sectional shape of the core layer 301 becomes quadrilateral.

The applicant of the present application has investigated several approaches for making the cross section of the optical waveguide circular, and disclosed them for example in Japanese Patent Application No. 2000-180648. However, in these approaches, a process that is completely different from existing processes is used, which creates the new problem of high costs.

On the other hand, to realize an optical transmission line with low optical losses, a uniform transparency without optical dispersion and high-quality film forming properties are desired for the polymer material of the optical waveguide that serves as the core layer. To realize a core layer with high transparency, bulky molecular components are introduced into the polymer in conventional polymer optical waveguides, in order to prevent inter-molecular stacking and crystallization and to achieve amorphousness. However, this approach causes the problem that the polymer matrix tends to become brittle.

In view of these problems, it is a first object of the present invention to provide a planar optical waveguide having a substantially circular cross section with an easy process and a method for manufacturing the same. It is a second object of the present invention to provide a polymer optical waveguide with more uniform transparency and with excellent durability, adhesiveness, etc.

SUMMARY OF THE INVENTION

A first planar optical waveguide in accordance with the present invention comprises a layered film formed on a substrate, and an optical waveguide core formed in the layered film, wherein a cross section of the optical waveguide core is substantially quadrilateral, wherein a dopant layer including refractive index-lowering molecules is provided around the optical waveguide core having a substantially quadrilateral cross section, and wherein the refractive index-lowering molecules included in the dopant layer are unevenly distributed in the optical waveguide core with a concentration that is higher toward outer sides and corners of the optical waveguide core, whereby a graded-index optical waveguide is constituted. It should be noted that in the present specification, "around" does not necessarily mean "encircling" but is mainly used in the sense of "disposed to the side of" or "disposed in the vicinity of".

In a preferred embodiment, the dopant layer is formed on the substrate, and the optical waveguide core is formed on the dopant layer.

In a preferred embodiment, the dopant layer is formed on an upper side of the optical waveguide core.

It is preferable that the optical waveguide core includes a polymer material, the refractive index-lowering molecules include fluorinated compatible molecules whose fluorine concentration is higher than that of the polymer material, and the fluorinated compatible molecules are reacted with reactive groups included in the polymer material to immobilize the fluorinated compatible molecules by chemical bonding.

It is preferable that the polymer material is at least one fluorinated polymer material selected from the group consisting of fluorinated polyimide, fluorinated polysiloxane and fluorinated polymethacrylate resins, and the refractive index-lowering molecules include fluorinated compatible molecules whose fluorine concentration is higher than that of the fluorinated polymer material.

A first method for manufacturing a planar optical waveguide in accordance with the present invention includes (a) a step of forming a first dopant film including refractive index-lowering molecules on a substrate, (b) a step of forming a thin film to serve as optical waveguide core on the substrate, and subsequently forming an optical waveguide core with substantially quadrilateral cross section by etching the thin film, (c) a step of forming a second dopant layer including refractive index-lowering molecules on an upper side of the optical waveguide core with substantially quadrilateral cross section, and (d) a step of doping the refractive index-lowering molecules from the first and second dopant layers into the optical waveguide core with substantially quadrilateral cross section, whereby the refractive index-lowering molecules is distributed unevenly with a concentration that is higher toward outer sides and corners of the optical waveguide core.

In a preferable embodiment, step (d) includes a thermal processing step.

It is preferable that the refractive index-lowering molecules are fluorinated compatible molecules, and that by at least one process selected from the group consisting of UV light processing, electron beam processing, plasma processing and thermal processing, a polymer material constituting the optical waveguide core is reacted with reactive groups included in the fluorinated compatible molecules, which are the refractive index-lowering molecules with which the optical waveguide core is doped, whereby the polymer material and the fluorinated compatible molecules are immobilized by chemical bonding.

A second planar optical waveguide in accordance with the present invention has an optical waveguide core, the optical waveguide core is formed over a substrate, a low refractive index layer including refractive index-lowering molecules is formed around the optical waveguide core, and the optical waveguide core includes the refractive index-lowering molecules at its periphery.

It is preferable that the refractive index-lowering molecules are distributed with higher concentration toward the outer sides of the optical waveguide core.

A second method for manufacturing a planar optical waveguide in accordance with the present invention includes a step of forming a dopant layer including refractive index-lowering molecules on a substrate, and a step of forming an optical waveguide core on the dopant layer, and subsequent thermal processing.

A third method for manufacturing a planar optical waveguide in accordance with the present invention includes a step of forming an optical waveguide core on a substrate, and a step of forming a dopant layer including refractive index-lowering molecules around the optical waveguide core, and subsequent thermal processing.

A fourth method for manufacturing a planar optical waveguide in accordance with the present invention includes a step of forming a first dopant layer including refractive index-lowering molecules on a substrate, a step of forming an optical waveguide core on the first dopant layer, and a step of forming a second dopant layer including refractive index-lowering molecules on the first dopant layer, covering the optical waveguide core, and subsequent thermal processing.

It is preferable that heating is performed such that lines of equal concentration of the refractive index-lowering molecules in a cross section of the optical waveguide core become substantially circular.

A polymer optical waveguide in accordance with the present invention, made of a polymer composition obtained by adding, to at least one fluorinated polymer material selected from the group consisting of fluorinated polyimide, fluorinated polymethacrylate and fluorinated polysiloxane, fluorinated compatible molecules whose fluorine concentration is higher than that of the fluorinated polymer material.

It is preferable that the fluorinated compatible molecules are unevenly distributed with a concentration that is higher toward outer sides of a cross section of the polymer optical waveguide.

In a preferred embodiment, reactive groups included in the fluorinated compatible molecules are reacted with reactive groups included in the fluorinated polymer material to form chemical bonds.

In a preferred embodiment, the fluorinated polymer material is a fluorinated polyimide, and the fluorinated compatible molecules are a fluoride selected from the group consisting of (1) polyvinylpyrrolidone, (2) (methylmethacrylate—vinyl pyrrolidone) copolymer, and (3) composition including polymethylmethacrylate and (methylmethacrylate—vinyl pyrrolidone) copolymer.

It is preferable that the fluorinated polymer material is a fluorinated polymethylmethacrylate resin, and the fluorinated compatible molecules are an organic compound including a tertiary fluoromethyl group.

It is preferable that the organic compound including a tertiary fluoromethyl group includes at least one selected from an OH group, an epoxy group and an isocyanate group, and at least one of the OH group, the epoxy group and the isocyanate group is reacted with a carboxyl group in the fluorinated polymethylmethacrylate resin to form a chemical bond, whereby immobilization is achieved.

It is preferable that the fluorinated polymer material is a fluorinated polysiloxane, and the fluorinated compatible molecules are a siloxane skeleton compound including a tertiary fluoromethyl group.

It is preferable that the siloxane skeleton compound added to the fluorinated polysiloxane has at least one of a Si—OH group and a Si—Cl group, and chemical bonds are formed by reacting the at least one of a Si—OH group and a Si—Cl group with a reactive group in the fluorinated polysiloxane.

It is preferable that an organic compound including the fluorinated compatible group and an incompatible group including active hydrogen is added at not more than 2 wt % to the fluorinated polymer material.

It is preferable that the fluorinated compatible group is at least one selected from the group consisting of $-CF_{1-3}H_{2-0}$, $=CF_2$, $-C_nF_mH_{2n-m+1}$ (with $n \geq 1$, $2n \geq m \geq 1$), $-C_nF_mH_{2n-m}$ (with $n \geq 1$, $2n \geq m \geq 1$), and $-C_6F_mH_{6-m}$ (with $5 \geq m \geq 1$), and the incompatible group including active hydrogen is at least one selected from the group consisting of $-CONH_2$, $-NH3$, $-OH$, and $-COOH$.

The planar optical waveguide of the present invention includes refractive index-lowering molecules at a periphery of an optical waveguide core portion formed on a substrate, whereby an optical waveguide having a refractive index difference in the optical waveguide core can be formed, and a graded-index planar optical waveguide can be obtained.

Furthermore, in the method for manufacturing a planar optical waveguide of the present invention, a dopant layer including refractive index-lowering molecules is formed on a substrate, an optical waveguide core is formed on this dopant layer, and then thermal processing is performed. When performing thermal processing in this manner, the refractive index-lowering molecules in the dopant layer migrate into the optical waveguide core, so that a substantially circular optical waveguide can be formed in the optical waveguide core.

A polymer optical waveguide in accordance with the present invention is made of a polymer composition obtained by adding, to at least one fluorinated polymer material (fluorinated polymer matrix) selected from fluorinated polyimide, fluorinated polymethacrylate and fluorinated polysiloxane, fluorinated compatible molecules whose fluorine concentration is higher than that of the fluorinated polymer material. With this configuration, fluorinated compatible molecules having a fluorine concentration that is higher than that of the fluorinated polymer material are given to that fluorinated polymer material, and the fluorinated compatible molecules act as a plasticizer in the polymer material (matrix), so that a solid solution is formed, and an amorphous molecular aggregate is formed. Consequently, it is possible to obtain an excellent core layer with uniform transparency and without optical dispersion. Furthermore, by adding, to a fluorinated polymer material, fluorinated compatible molecules having a fluorine concentration that is higher than that of the fluorinated polymer material, the refractive index of the portion to which the fluorinated polymer material has been added can be lowered.

In accordance with the present invention, a dopant layer including refractive index-lowering molecules is provided around an optical waveguide core, and the refractive index-lowering molecules included in the dopant layer are unevenly distributed in the optical waveguide core with a concentration that is higher toward outer sides and corners of said optical waveguide core, so that a planar optical waveguide with substantially circular cross section can be accomplished with a simple process.

Furthermore, a polymer optical waveguide of the present invention is made of a polymer composition obtained by adding, to at least one fluorinated polymer material selected from the group consisting of fluorinated polyimide, fluorinated polymethacrylate and fluorinated polysiloxane, fluorinated compatible molecules whose fluorine concentration is higher than that of the fluorinated polymer material, so that the uniform transparency of the optical waveguide is improved, and an optical waveguide with excellent durability and adhesiveness is obtained.

DETAILED DESCRIPTION OF THE INVENTION

Figure 1:
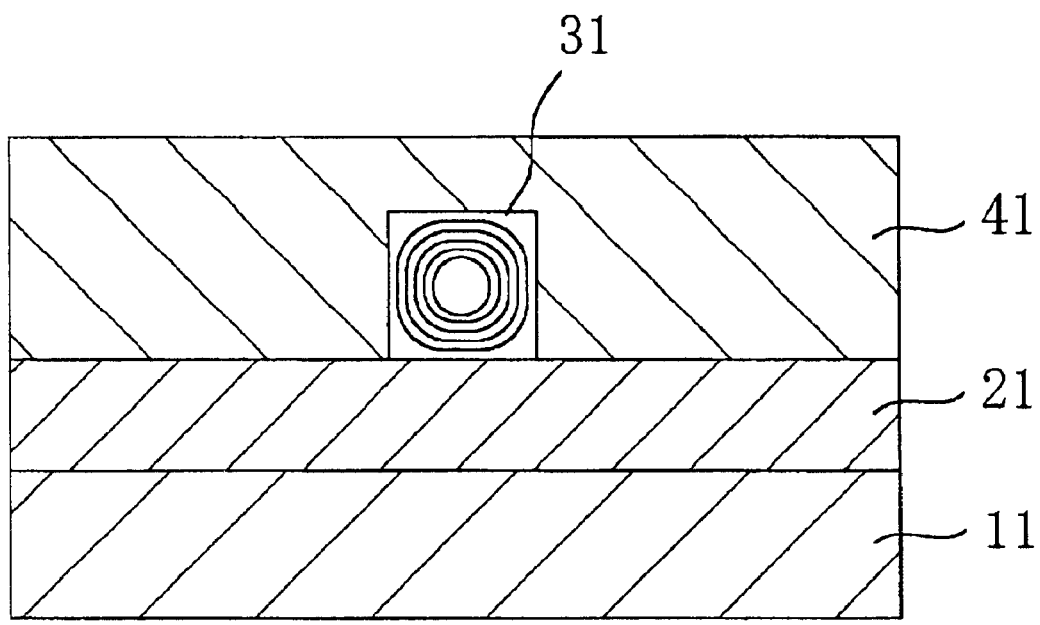
FIG. 1 is a cross-sectional view of a planar optical waveguide in accordance with a first embodiment of the present invention.

The following is a detailed description of embodiments of the present invention, with reference to the accompanying drawings. In order to simplify the explanations, structural elements in the drawings that have substantially the same function are denoted by the same reference numerals. It should further be noted that the present invention is not limited to the following embodiments.

First Embodiment

Referring to FIG. 1, the following is an explanation of a planar optical waveguide in accordance with a first embodiment of the present invention. FIG. 1 schematically shows the cross-sectional configuration of the planar optical waveguide of this embodiment.

The planar optical waveguide of this embodiment includes a layered film (21, 41) formed on a substrate 11, and an optical waveguide core 31 formed inside the layered film (21, 41). The optical waveguide core 31 has a substantially quadrilateral cross section, and the dopant layers 21 and 41, which include refractive index-lowering molecules, are formed around the optical waveguide core 31. Refractive index-lowering molecules included in the dopant layers 21 and 41 are unevenly distributed in the optical waveguide core 31, with a concentration that is higher toward the outer sides and the corners of the optical waveguide core 31. With such an uneven distribution, a graded-index optical waveguide is achieved. The dopant layers include the refractive index-lowering molecules, or in other words, the dopant layers are migrating molecule supply layers. Moreover, "refractive index-lowering molecules" refers to molecules that lower the refractive index of a substance when they are introduced into that substance.

The following is a more detailed explanation of the configuration of the present embodiment. The substrate 11 is made of silicon for example, and in the present embodiment, a substrate 11 is used, in which an oxide film (not shown in the drawings) has been formed on the surface of a silicon substrate. It should be noted that throughout this specification, the term "substrate" may also be used to refer a substrate including one or more layers that are formed on the surface of a substrate serving as the base (main substrate).

A lower dopant layer 21 (first dopant layer) is formed on the silicon substrate 11 on which the oxide film (not shown in the drawings) has been formed, and the thickness of this lower dopant layer 21 is for example 5 to 100 $\mu$m, and is typically 10 $\mu$m. The dopant layer 21 is a lower migrating molecule supply layer (first migrating molecule supply layer), from where refractive index-lowering molecules migrate into the core layer serving as the optical waveguide core.

The core layer 31, which is a optical waveguide core with a substantially quadrilateral (rectangular) cross section, is formed on the lower dopant layer 21. The core layer 31 is made of polydi(phenyl fluoride)siloxane. It is sufficient if the cross-sectional shape of the core layer 31 is approximately quadrilateral, and it is not limited to geometrically quadrilateral shapes. In consideration of the manufacturing process, it is sufficient if it is substantially quadrilateral, for example.

The core 31 includes methyl(trifluoromethyl)siloxane trimers (3M3FSi) as the refractive index-lowering molecules. In other words, the core layer 31 made of polydi(phenyl fluoride)siloxane is doped with methyl(trifluoromethyl) siloxane trimers (3M3FSi). The 3M3FSi is unevenly distributed, such that its concentration increases from the center of gravity (middle) of the cross section of the core layer 31 outward toward the perimeter (outer sides) of the cross section. Consequently, in the cross section of the quadrilateral shape of the core layer 31, the refractive index decreases toward the sides. FIG. 1 shows the lines of equal concentration, illustrating the distribution in the core layer 31. As shown in FIG. 1, the lines of equal concentration become more circular (or substantially circular) toward the center of gravity, whereas approaching the sides, the circular shape becomes closer to the cross-sectional shape of the core.

Covering the core layer 31, an upper dopant layer (second dopant layer) 41 for letting refractive index-lowering molecules migrate into (dope) the core layer 31 is formed on the core layer 31 and the lower dopant layer 21. It is preferable that the lower dopant layer 21 and the upper dopant layer 41 are made of a material with a refractive index that is lower than that of the core layer 31. This ensures that the lower dopant layer 21 and the upper dopant layer 41 can be used as a cladding layer for the core layer 31.

Furthermore, if the core layer 31 is made of a fluorinated polymer material (fluorinated polymer matrix), then the refractive index-lowering molecules have a fluorine concentration that is higher than that of the core layer 31, and when using a fluorinated compatible molecule acting as a plasticizer in the fluorinated polymer matrix of the core layer 31, the fluorinated compatible molecules with which the core layer 31 is doped can be used to work as a plasticizer in the fluorinated polymer matrix, so that the brittleness (generation of cracks) can be improved, and an optical waveguide with better transparency, film forming properties and uniformity can be attained.

Moreover, in this case, it is preferable that reactive groups of the fluorinated compatible molecules and reactive groups in the fluorinated polymer matrix are reacted for immobilization by chemical bonding. Thus, the doped fluorinated compatible molecules are not dispersed throughout the fluorinated polymer matrix, so that a constant composition can be maintained in a thermal environment, and a superior polymer optical waveguide with high temporal stability can be attained. Furthermore, since the fluorine concentration increases in the core layer 31 towards the outer sides of the cross section, the refractive index in those portions is low, and the refractive index difference between cladding and core can be made large, improving the propagation properties of light. It should be noted that "fluorine concentration" refers to the density of fluorine atoms, or more precisely to the number of fluorine atoms per unit volume (fluorine atoms/$cm^3$).

It is preferable that molecules including for example alkyl groups, alkoxy groups, ester groups or carbonate groups having a plasticizing effect are chosen as the refractive index-lowering molecules.

The behavior that the refractive index-lowering molecules, which have a plasticizing effect, are immobilized by chemical bonding means that the polymer composition of which just the outer portion is plasticized undergoes an "internal plasticization" by an immobilization reaction, and the refractive index-lowering molecules form soft segments in the polymer, achieving favorable mechanical and optical properties.

Examples of the fluorinated polymer material (fluorinated polymer matrix) that constitutes the core layer 31 include (i) fluorinated polyimides, (ii) fluorinated polymethylmethacrylate resin and (iii) fluorinated polysiloxanes.

(i) When a fluorinated polyimide is used as the fluorinated polymer matrix, then it is preferable to use for the fluorinated compatible molecules a fluoride of a compound including a vinyl pyrrolidone skeleton selected from any of the following (1) to (3):

(1) polyvinylpyrrolidone;

(2) (methylmethacrylate—vinyl pyrrolidone) copolymer; and (3) composition including polymethylmethacrylate and (methylmethacrylate—vinyl pyrrolidone) copolymer.

Compounds including a vinyl pyrrolidone skeleton have a high compatibility toward polyimides, so that similarly also their fluorides have a high compatibility toward fluorinated polyimides, and are therefore excellent dopants.

In general, polyimides are crosslinked to imide structures by thermal polycondensation of a solid film with low molecular diffusion, so that they pose the disadvantage that there are many unreacted groups that have not been polycondensated in the solid film, and also fluorinated polyimides undergo the same curing reaction, so that there are many unreacted COOH groups and —NH— groups in the solid film. Consequently, a polymer optical waveguide immobilized by chemical bonding is attained by reacting the these unreacted groups and the fluorinated compound including a vinyl pyrrolidone skeleton.

(ii) When fluorinated polymethylmethacrylate resin is used as the fluorinated polymer matrix, then it is preferable that an organic compound having a tertiary fluoromethyl group is used for the fluorinated comptabile molecules. Adding an organic compound having a tertiary fluoromethyl group to the fluorinated polymethylmethacrylate resin reduces structural strain, and increases amorphousness, so that an excellent optical resin with higher transparency and lower refractive index can be attained. When some of the esters of the fluorinated polymethylmethacrylate resin are hydrolyzed, reactive functional COOH groups in the polymer matrix are obtained, which can be used for the immobilization reaction.

It is preferable that the organic compound having a tertiary fluoromethyl group has an OH group, an epoxy group or an isocyanate group, and immobilization is achieved with ester bonds, urethane bonds or epoxy curing bonds by reacting the unreacted carboxyl groups in the fluorinated polymethylmethacrylate resin.

(iii) When a fluorinated polysiloxane is used as the fluorinated polymer matrix, then it is preferable that a siloxane skeleton compound having a tertiary fluoromethyl group is used for the fluorinated comptabile molecules. Adding a siloxane skeleton compound having a tertiary fluoromethyl group to the fluorinated polysiloxane reduces structural strain, and increases amorphousness, so that an excellent optical resin with higher transparency and lower refractive index can be attained.

Polysiloxanes, as typified by silicone resins, are transparent when taken by themselves, and fluorinated polysiloxanes, with fluorinated substitutuents such as methyl groups or phenyl groups, are excellent optical resins with an even lower refractive index. The fluorinated polymer matrix of the present embodiment is configured by unevenly distributing a siloxane skeleton compound having a tertiary fluoromethyl group therein. In order to further increase the transparency in the infrared region, which is necessary for optical waveguides, deuterium may be introduced into the polysiloxane.

Furthermore, a reactive fluorinated polysiloxane can be easily attained when reactive functional groups such as OH groups or COOH groups are introduced into the methyl groups or the phenyl groups, which are organic substituent groups of the fluorinated polysiloxane. Thus, the siloxane skeleton compound that is unevenly distributed in the polymer matrix is immobilized by ester bonds, urethane bonds, amide bonds, or epoxy curing bonds.

Referring to FIGS. 2A to 2D, the following is an explanation of a method for manufacturing a planar optical waveguide in accordance with the present embodiment. It should be noted that FIGS. 2A to 2D are cross-sectional process diagrams illustrating the manufacturing method of the present embodiment.

Figure 2A:
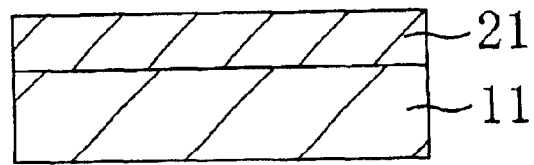
FIGS. 2A to 2D are cross-sectional process diagrams illustrating a method for manufacturing a planar optical waveguide in accordance with the first embodiment.

First, a substrate 11 made of silicon on the surface of which an oxide film (not shown in the drawings) has been formed is prepared, and, as shown in FIG. 2A, a fluorotoluene solution including 3M3FSi as the refractive index-lowering molecules and polydi(tri-phenylfluoride)siloxane at a weight ratio of 1:1 is cast onto the substrate 11, thus forming the lower dopant layer 21. The thickness of the lower dopant layer 21 is 10 $\mu$m, for example.

Figure 2B:
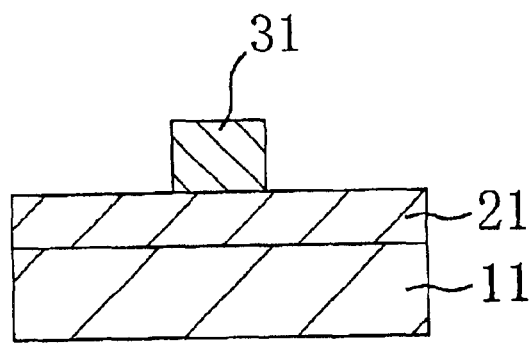

Then, as shown in FIG. 2B, a polydi(phenylfluoride) siloxane thin film is formed on the lower dopant layer 21 and etched with an oxygen plasma, forming a core layer 31 with a quadrilateral cross section serving as the optical waveguide core.

Figure 2C:
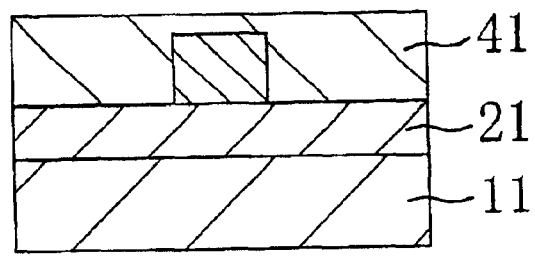

Then, as shown in FIG. 2C, an upper dopant layer 41 is formed on the core layer 31 and the lower dopant layer 21, covering the core layer 31. The upper dopant layer 41 is formed using the same fluorotoluene solution as for the lower dopant layer 21. That is to say, the same fluorotoluene solution as for the lower dopant layer 21, containing 3M3FSi as the refractive index-lowering molecules and polydi(tri-phenylfluoride)siloxane at a weight ratio of 1:1, is used to form the upper dopant layer 41.

Figure 2D:
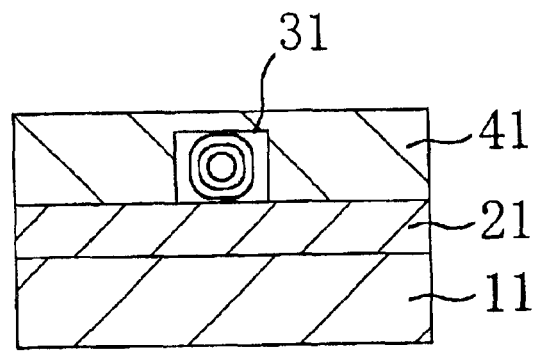

Then, as shown in FIG. 2D, the 3M3FSi (i.e. the refractive index-lowering molecules) included in the lower dopant layer 21 and the upper dopant layer 41 are caused to migrate into (dope) the core layer 31, leading to an uneven distribution. This doping is performed by thermal processing at a temperature of, for example, 150° C.

In this situation, the 3M3FSi in the lower dopant layer 21 and the upper dopant layer 41 migrate (dope) from the outer sides of the core layer 31, that is, the portions close to the lower dopant layer 21 and the upper dopant layer 41, so they are distributed unevenly with a higher concentration toward the portions that are closer to the lower dopant layer 21 and the upper dopant layer 41. More specifically, the uneven distribution is such that the concentration is particularly high towards the corners of the quadrilateral, so that the cross section of the portion of the core layer 31 that serves as the optical waveguide is substantially circular, and a graded-index optical waveguide is obtained. It should be noted that light that was guided along the core layer 31 shone out in a substantially circular shape, with the middle of the core layer 31 (center of gravity of the quadrilateral) at the center, when viewed from an end face of the core layer 31. Furthermore, when measuring the optical waveguide characteristics, it was found that a coherent light transmission with high SN ratio was achieved.

Furthermore, it is possible to obtain a graded-index optical waveguide with even higher stability by further curing the core layer 31 by electron beam irradiation after the 3M3FSi has migrated into the core layer 31, and immobilizing the 3M3FSi, that is, the dopant molecules. This is because the reactive groups of the 3M3FSi doped into the matrix of the core layer 31 and the reactive groups of the core layer 31 can be immobilized by chemical bonding to one another. In this case, the temporal changes in an optical waveguide in which the core layer 31 has been irradiated with an electron beam are only about $\frac{1}{12}$ of those of an optical waveguide in which the core layer has not been irradiated with an electron beam. It should be noted that in the first embodiment, immobilization was achieved by electron beam irradiation, but depending on the material of the core layer 31 and the refractive index-lowering molecules, it is also possible to use a method of immobilizing by UV light, plasma or by heat.

Second Embodiment

Figure 3:
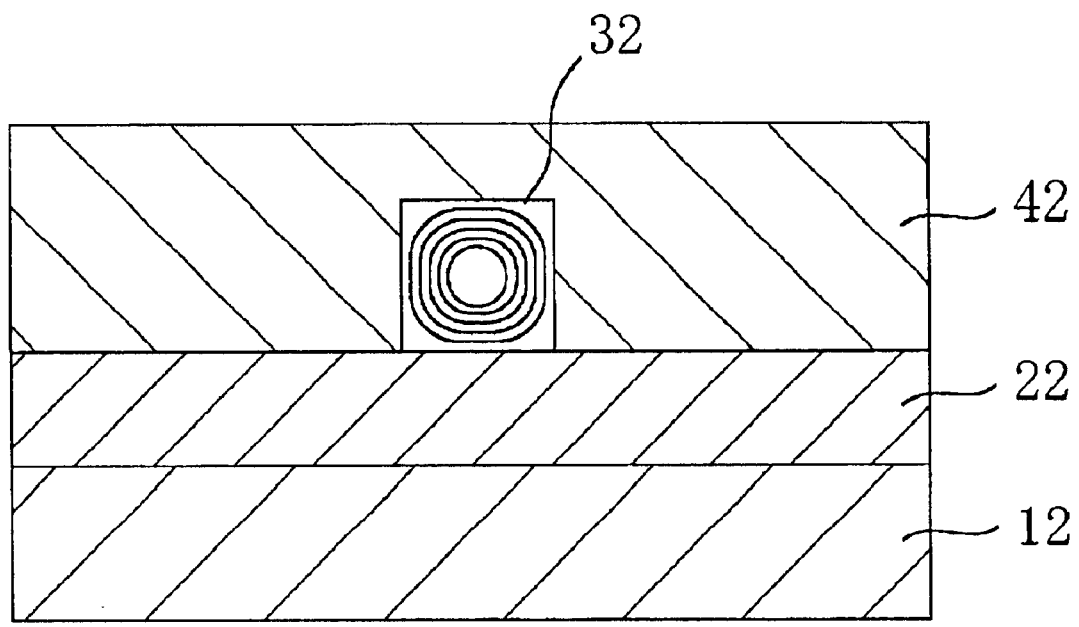
FIG. 3 is a cross-sectional view of a planar optical waveguide in accordance with a second embodiment of the present invention.

Referring to FIG. 3, the following is an explanation of a planar optical waveguide in accordance with a second embodiment. FIG. 3 schematically shows the cross-sectional configuration of the planar optical waveguide of this embodiment. It should be noted that for simplification, explanations that are the same as in the first embodiment have been omitted or abbreviated.

In the planar optical waveguide of this embodiment, a lower dopant film (first dopant film) 22 for letting refractive index-lowering molecules migrate into the core layer is formed on a substrate 12 made of silicon on which an oxide film (not shown in the drawings) has been formed. The thickness of the lower dopant film 22 is for example 10 $\mu$m.

A core layer 32 serving as an optical waveguide core with a quadrilateral cross section is formed on the lower dopant layer 22. The core layer 32 is made of polydi (phenylfluoride)siloxane, and includes, as refractive index-lowering molecules, (trifluoromethylmethacrylate vinylpyrrolidone (weight concentration=3:1)) co-oligomers (3FMMA-VPY). This 3FMMA-VPY is unevenly distributed, such that its concentration increases from the center of gravity of the cross section of the core layer 32 outward toward the perimeter (outer sides) of the cross section. FIG. 3 shows the lines of equal concentration, illustrating the distribution in the core layer 32. As shown in FIG. 3, the lines of equal concentration become more circular (or substantially circular) toward the center of gravity, whereas approaching the sides, the circular shape becomes closer to the cross-sectional shape of the core.

Covering the core layer 32, an upper dopant layer (second dopant layer) 42 for letting refractive index-lowering molecules migrate into the core layer 32 is formed on the lower dopant layer 22.

Referring to FIGS. 4A to 4D, the following is an explanation of a method for manufacturing a planar optical waveguide in accordance with the present embodiment. It should be noted that FIGS. 4A to 4D are cross-sectional process diagrams illustrating the manufacturing method of the present embodiment.

Figure 4A:
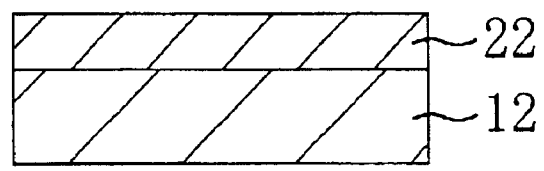
FIGS. 4A to 4D are cross-sectional process diagrams illustrating a method for manufacturing a planar optical waveguide in accordance with the second embodiment.

First, as shown in FIG. 4A, a lower dopant layer 22 of for example 10 $\mu$m thickness is formed on a substrate 12 made of silicon on which an oxide film (not shown in the drawings) has been formed. The lower dopant layer 22 is formed by casting an N-methylpyrrolidone solution including 3FMMA-VPY as the refractive index-lowering molecules and polydi(tri-phenylfluoride)siloxane at a weight ratio of 1:1.

Figure 4B:
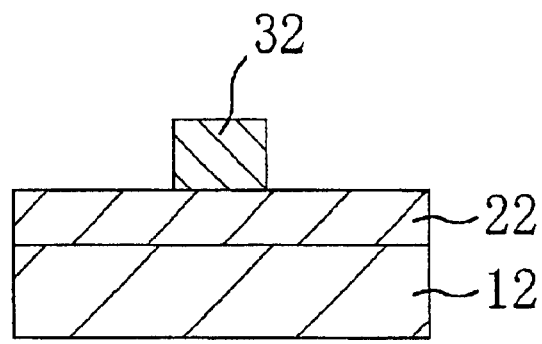

Then, as shown in FIG. 4B, a dimethyl acetoamide (DMAc) solution of (6FDA-ODA) polyamic acid is applied on the lower dopant layer 22, and then, a fluorinated polyimide film is formed by thermal processing at 250° C. for one hour. Then, a core layer 32 with a quadrilateral cross section serving as the optical waveguide is formed by etching with an oxygen plasma. Here, "6FDA" refers to 2,2'-bis (3,4-dicarboxyphenyl) hexafluoropropanedianhydride), and "ODA" refers to 4,4'-oxydianiline.

Figure 4C:
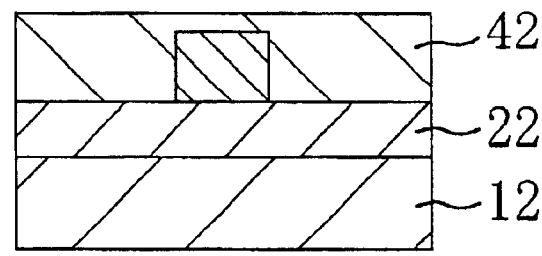

Then, as shown in FIG. 4C, an upper dopant layer 42 is formed on the lower dopant layer 22, covering the core layer 32. The upper dopant layer 42 is formed using the same N-methylpyrrolidone solution as for the lower dopant layer 22. That is to say, a N-methylpyrrolidone solution containing 3FMMA-VPY as the refractive index-lowering molecules and polydi(tri-phenylfluoride)siloxane at a weight ratio of 1:1, is used to form the upper dopant layer 42.

Figure 4D:
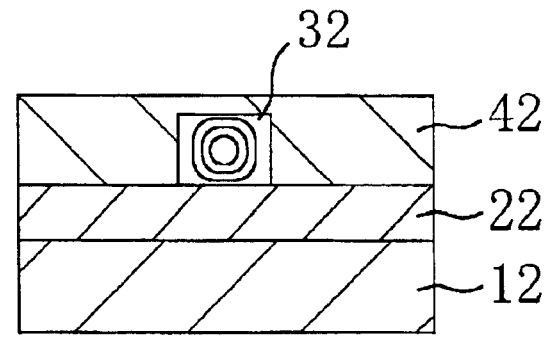

Then, as shown in FIG. 4D, the 3FMMA-VPY (i.e. the refractive index-lowering molecules) included in the lower dopant layer 22 and the upper dopant layer 42 are caused to migrate into (dope) the core layer 32, leading to an uneven distribution. This doping is performed by thermal processing at a temperature of, for example, 140° C.

In this situation, the 3FMMA-VPY migrates from the outer sides of the core layer 32, that is, the portions close to the lower dopant layer 22 and the upper dopant layer 42, so that it is distributed unevenly with a higher concentration toward the portions that are closer to the lower dopant layer 22 and the upper dopant layer 42. More specifically, the uneven distribution is such that the concentration is particularly high towards the corners of the rectangle, so that the cross section of the portion of the core layer 32 that serves as the optical waveguide is substantially circular, and a graded-index optical waveguide is obtained. It should be noted that light that was guided along the core layer 32 shone out in a substantially circular shape, with the middle of the core layer 32 (center of gravity of the quadrilateral) at the center, when viewed from an end face of the core layer 32. Furthermore, when measuring the optical waveguide characteristics, it was found that a coherent light transmission with high SN ratio was achieved.

Furthermore, it is possible to obtain a graded-index optical waveguide with even higher stability by further crosslinking the core layer 32 by UV irradiation after the 3FMMA-VPY has migrated into the core layer 32, thus immobilizing the 3FMMA-VPY. This is because the reactive groups of the 3FMMA-VPY doped into the matrix of the core layer 32 and the reactive groups of the core layer 32 can be immobilized by chemical bonding to one another. In this case, the temporal changes in an optical waveguide in which the core layer 32 has been irradiated with UV light are only about ⅕ of those of an optical waveguide in which the core layer has not been irradiated with UV light.

The planar optical waveguides according to the first and the second embodiment include refractive index-lowering molecules at the peripheral portions in an optical waveguide core formed on a substrate. Thus, an optical waveguide having a refractive index difference in the optical waveguide core can be formed, and a graded-index planar optical waveguide can be obtained.

Graded-index optical waveguides are particularly suitable for optical waveguides for wavelength division multiplexing (WDM) optical communication, which are very promising for future high-speed high-capacity communication, and such graded-index planar optical waveguides are very advantageous for configuring optical waveguides for WDM.

Furthermore, in the above-described method for manufacturing a planar optical waveguide of the present embodiment, a dopant layer including refractive index-lowering molecules is formed on a substrate, an optical waveguide core is formed on this dopant layer, and then, thermal processing is carried out. Consequently, the thermal processing lets the refractive index-lowering molecules of the dopant layer migrate into the core of the optical waveguide, and a substantially circular optical waveguide is formed in the optical waveguide core. Furthermore, easy manufacture is possible with existing equipment.

Third Embodiment

The following is an explantion of a polymer waveguide in accordance with the third embodiment. Here, some of the explanations for the above-described embodiments also apply to the polymer optical waveguide in accordance with the third embodiment, and the elements that are common to the polymer optical waveguide of the present embodiment are explained first.

Similar to the first and the second embodiments, also the core layer in the third embodiment is made of a fluorinated polymer material (fluorinated polymer matrix). For example, it can be made of a fluorinated polyimide, a fluorinated polymethacrylate, or a fluorinated polysiloxane.

Fluorinated compatible molecules having a fluorine concentration that is higher than that of the fluorinated polymer matrix are added (doped) to the fluorinated polymer matrix, so that the fluorinated polymer matrix constitutes a polymer composition. Here, "polymer composition" refers to a polymer composition, in which, even when the added fluorinated compatible molecules do not constitute the molecular compound in the polymer matrix, the fluorinated compatible molecules are taken up by the polymer matrix, and behave as one together with the polymer matrix. However, this does not exclude polymer compositions, in which the fluorinated compatible molecules constitute a molecular compound in the polymer matrix. Furthermore, "fluorine concentration" refers to the density of fluorine atoms, or more precisely to the number of fluorine atoms per unit volume (fluorine atoms/cm$^3$).

The fluorinated compatible molecules enter the fluorinated polymer matrix serving as the base, and act as a gel-like plasticizer in the fluorinated matrix. Due to this action, the fluorinated polymer matrix to which the fluorinated compatible molecules have been added (polymer composition) form a solid solution and form an amorphous molecular aggregate. Consequently, an excellent optical waveguide having uniform transparency without optical dispersion of light is obtained. Moreover, a low refractive index of the optical waveguide can be achieved in the portion where the fluorine concentration is high.

Furthermore, reactive groups of the fluorinated compatible molecules and reactive groups in the fluorinated polymer matrix of the polymer waveguide are reacted for immobilization by chemical bonding, thereby immobilizing the fluorinated compatible molecules in the fluorinated polymer matrix. Therefore, the fluorinated compatible molecules are not dispersed by heat, a constant composition can be maintained even in a thermal environment, and a superior polymer optical waveguide with high temporal stability can be attained.

Furthermore, the uneven distribution is such that the concentration of the fluorinated compatible molecules added into the fluorinated polymer matrix is higher towards the outer sides in the cross section of the optical waveguide, whereby the refractive index becomes lower in the portions where the fluorine concentration is high, thus configuring an optical waveguide with refractive index distribution (graded-index type). The uneven distribution with a higher concentration towards the outer sides can be easily accomplished by adding the fluorinated compatible molecules to the liquid phase or the gas phase.

As specific materials for the fluorinated polymer matrix, fluorinated polymethacrylate resins into which trifluoromethyl groups have been introduced and fluorinated polyimides into which di(trifluoro)isopropylene groups have been introduced are known, for example. However, it is preferable that it is not a fluorine substituent that is bulky and causes steric hindrances, and a material into which tetrafluorophenylene groups, polyfluoroalkyl groups or polyfluoroalkoxy groups or the like have been introduced is preferable.

Furthermore, molecules with good compatibility including polyfluoroalkyl groups, polyfluoroalkoxy groups, ester groups or carbonate groups or the like, having a plasticizing effect, are used for the fluorinated compatible molecules. Thus, the doped fluorinated compatible molecules act as a plasticizer, so that cracks in the fluorinated polymer matrix can be prevented, and an excellent polymer optical waveguide with better transparency, film forming properties and uniformity is formed.

The following is a more specific explanation of polymer waveguides in accordance with the third embodiment.

First Configuration

In this embodiment, the fluorinated polymer matrix is a fluorinated polyimide, and the fluorinated compatible molecules are a fluoride of a compound including a vinyl pyrrolidone skeleton selected from the following (1) to (3):

(1) polyvinylpyrrolidone;

(2) (methylmethacrylate—vinyl pyrrolidone) copolymer; and (3) composition including polymethylmethacrylate and (methylmethacrylate—vinyl pyrrolidone) copolymer.

Compounds including a vinyl pyrrolidone skeleton have a high compatibility toward polyimides, so that similarly also their fluorides have a high compatibility toward fluorinated polyimides, and are excellent dopants.

The (methylmethacrylate—vinyl pyrrolidone) copolymer of (2) is a highly transparent and amorphous copolymer of methylmethacrylate (MMA) and vinyl pyrrolidone, and the copolymer is formed with vinyl groups, so that a resin with excellent transparency and compatibility is obtained.

It should be noted that in general, polyimides crosslinked into imide structures by thermal polycondensation of a solid film with low molecular diffusion, so that they pose the disadvantage that there are many unreacted groups that have not been polycondensated in the solid film. Since fluorinated polyimides also undergo the same curing reaction, there are many unreacted COOH groups and —NH— groups in the solid film. In the present embodiment, these remaining groups are reacted with the fluorinated compound including the vinylpyrrolidone skeleton, so that a polymer optical waveguide that is immobilized by chemical bonding is obtained.

It is preferable that a high-boiling point solvent, such as N-methylacetoamide or N-methylpyrrolidone, is used for the polyamic acid solvent, which is the precursor (prepolymer) for forming polyamide. Furthermore, if an optical waveguide made of fluorinated polyimide is doped by immersing it in these solutions, then an uneven distribution can be attained, in which the concentration is higher toward the outer sides of the cross section, and a polymer optical waveguide with a graded refractive index can be easily attained.

It should be noted that (3) is a mixture of the copolymer (2) and MMA, and thus a modification of the material of (2).

Second Configuration

The following explains a configuration, in which, different from the previous configuration, a fluorinated polymethylmethacrylate (fluorinated PMMA) based resin is taken as the fluorinated polymer matrix, and an organic compound including tertiary fluoromethyl groups is taken as the fluorinated compatible molecules.

With this configuration, adding an organic compound having a tertiary fluoromethyl group to the fluorinated PMMA reduces structural strain and increases amorphousness, so that an excellent optical resin with higher transparency and lower refractive index can be attained.

Polymethylmethacrylate (PMMA; also referred to as "polymethylmeta-acrylate" itself already has high transparency, and fluorinated PMMA is an excellent optical resin with an even lower refractive index. In the present embodiment, a polymer composition that is even more transparent and has a lower refractive index can be configured by further adding an organic compound having a tertiary fluoromethyl group to the fluorinated PMMA. It should be noted that when some of the esters in the PMMA are hydrolyzed, reactive functional COOH groups in the polymer matrix are obtained, which can be used for the immobilization reaction.

When the organic compound having a tertiary fluoromethyl group has an OH group, an epoxy group or an isocyanate group, and is reacted with the unreacted carboxylic groups in the fluorinated PMMA resin to form chemical bonds, then the fluorinated compatible molecules are immobilized by ester bonds, urethane bonds or epoxy curing bonds.

Third Configuration

The following explains a configuration, in which a fluorinated polysiloxane is taken as the fluorinated polymer matrix, and a siloxane skeleton compound including tertiary fluoromethyl groups is taken as the fluorinated compatible molecules. With this configuration, adding a siloxane skeleton compound including tertiary fluoromethyl groups to the fluorinated polysiloxane reduces structural strain and increases amorphousness, so that an excellent optical resin with even higher transparency and lower refractive index can be attained.

Polysiloxanes, as typified by silicone resin, themselves already have high transparency, and fluorinated polysiloxanes, with fluorinated substitutuents such as methyl groups or phenyl groups, are excellent optical resins with an even lower refractive index, but in the third embodiment, a polymer composition that is even more transparent and has a lower refractive index can be configured by further adding a siloxane skeleton compound having a tertiary fluoromethyl group.

Furthermore, a reactive fluorinated polysiloxane can be easily attained when reactive functional groups such as OH groups or COOH groups are introduced into the methyl groups or the phenyl groups, which are the organic substituent groups of the fluorinated polysiloxane. Moreover, in order to further increase the transparency in the infrared region, which is necessary for optical waveguides, deuterium may be introduced into the polysiloxane.

Also, a fluorinated siloxane oligomer with low molecular weight may be used as the siloxane skeleton compound. When the siloxane skeleton compound has either a Si—OH group or a Si—Cl group, and is reacted with the reactive groups in the fluorinated polysiloxane to form chemical bonds for immobilization, then the siloxane skeleton compound can be immobilized by forming ester bonds, urethane bonds, amide bonds or epoxy curing bonds or the like. A fluorinated silane coupler or the like can also be utilized for the polymer optical waveguide manufactured in this manner.

Fourth Configuration

The following explains a configuration, in which not more than 2% of an organic compound having a fluorinated compatible group and an incompatible group including active hydrogen are added to the fluorinated polymer matrix.

Even though the added amount of the organic compound is low at not more than 2%, it is unevenly distributed near the surface of the cross section of the optical waveguide made of the fluorinated polymer matrix, due to the properties of the two functional groups, and the incompatible groups including active hydrogen stick out from the surface, so that this active hydrogen imparts adhesiveness on the surface of the optical waveguide. This adhesiveness increases the interfacial adhesiveness at the core/cladding, the cladding/substrate and the cladding/electrode bump interfaces of the optical waveguide module, so that an element with high reliability can be attained. Furthermore, the added amount is not higher than 2 wt %, so that the influence on the optical waveguide characteristics is low. It should be noted that "incompatible group" refers to a group having the quality of not blending easily with other molecules. By giving this incompatible group a specific function (here, the adhesiveness of the active hydrogen), it is possible to impart this specific function to the surface of those molecules. In this example, the adhesiveness is imparted on the surface of the molecules by the incompatible group having the active hydrogen.

The fluorinated compatible group is selected from $-CF_{1-3}H_{2-0}$, $=CF_2$, $-C_nF_mH_{2n-m+1}$ (with $n \geq 1$, $2n \geq m \geq 1$), $-C_nF_mH_{2n-m}$ (with $n \geq 1$, $2n \geq m \geq 1$), and $-C_6F_mH_{6-m}$ (with $5 \geq m \geq 1$), and the incompatible group including active hydrogen is an organic compound selected from the group consisting of $-CONH_2$, $-NH_3$, $-OH$, and $-COOH$. With such an organic compound, a polymer optical waveguide with excellent surface adhesiveness can be obtained by adding only a small amount of not more than 2 wt %.

Manufacturing Method

The following is an explanation of a method for manufacturing a polymer waveguide in accordance with the present embodiment. FIGS. 5A to 5D are cross-sectional process diagrams for a graded-index planar polymer waveguide in accordance with the present embodiment.

Figure 5A:
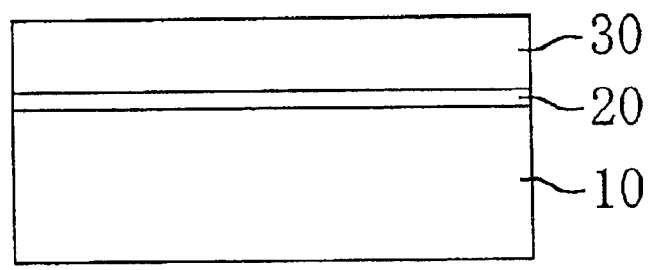
FIGS. 5A to 5D are cross-sectional process diagrams illustrating a method for manufacturing a graded-index planar polymer waveguide in accordance with a third embodiment.

As shown in FIG. 5A, a film is formed by casting a dimethylacetoamide (DMAc) solution of (6FDA-ODA) polyamic acid onto an oxide film 20 formed on a silicon substrate 10, and by subsequently drying for one hour at 160° C. and curing for one hour at 250° C., a fluorinated polyimide film 30, which is a transparent fluorinated polymer matrix, is formed. Here, "6FDA" is 2,2'-bis(3,4-dicarboxyphenyl) hexafluoropropanedianhydride, and "ODA" is 4,4'-oxydianiline. The thickness of the oxide film 20 is for example 1 to 10 μm, and the thickness of the fluorinated polyimide film 30 is for example 50 to 200 μm.

Figure 5B:
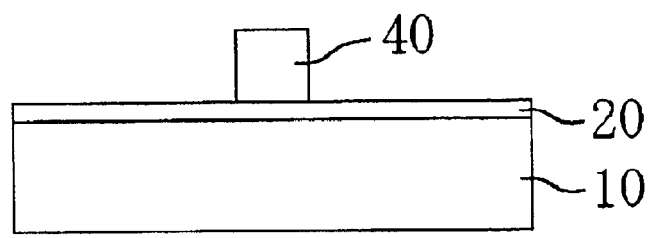

Then, as shown in FIG. 5B, the fluorinated polyimide film 30 is formed by photolithography and etching into a rectangular optical waveguide 40 with a cross-sectional side length of for example 45 μm.

Figure 5C:
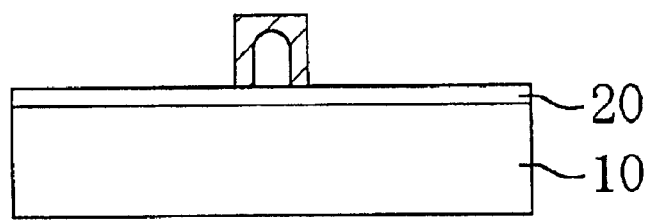

Then, as shown in FIG. 5C, the silicon substrate 10 on which the optical waveguide has been formed is immersed in an N-methylpyrrolidone solution of (trifluoromethylmethacrylate vinylpyrrolidone (3:1)) co-oligomers, which are fluorinated compatible molecules with a fluorine concentration that is higher than that of the fluorinated polyimide film 30, and then, the surface is swelled somewhat, thus adding (doping) this co-oligomer. In FIG. 5C, the hatched portion denotes the doped portion in the optical waveguide 40. It is also possible to irradiate the doped optical waveguide 40 with an electron beam, and to immobilize the oligomers by crosslinking mainly the vinyl portion.

Figure 5D:
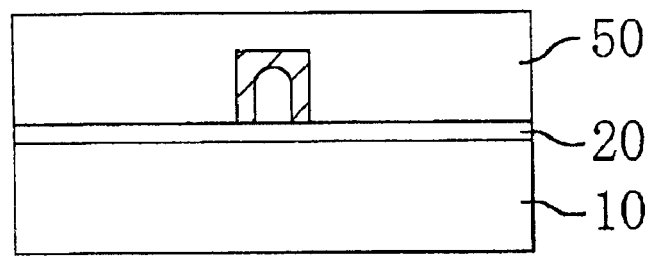

Then, as shown in FIG. 5D, a film is formed by casting a dimethylacetoamide (DMAc) solution of (6FDA-TFDB) polyamic acid on the optical waveguide 40, and by subsequent drying for one hour at 160° C. and curing for one hour at 250° C., an upper cladding layer 50 made of a transparent fluorinated polyimide film is formed. Here, "TFDB" is 2,2'-bis(trifluoromethyl 9-4,4'-diaminobiphenyl. The thickness of the upper cladding layer 50 is for example 10 to 100 μm.

The cross section of the manufactured optical waveguide is rectangular, but the corner portions of this rectangle are doped with many co-oligomers with a high fluorine concentration, significantly decreasing the refractive index, so that the cross section of the optical waveguide is substantially close to being circular.

Figure 6A:
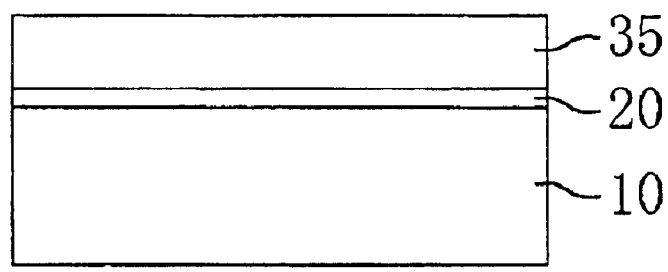
FIGS. 6A to 6C are cross-sectional process diagrams illustrating a method for manufacturing a graded-index planar polymer waveguide in accordance with a third embodiment.
Figure 6B:
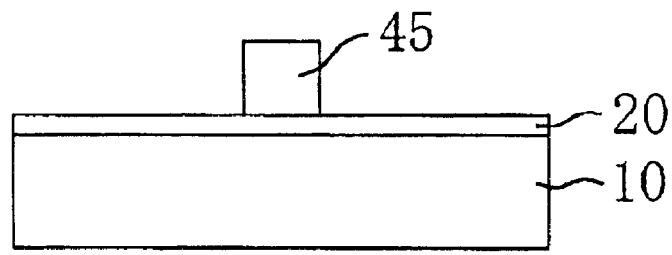
Figure 6C:
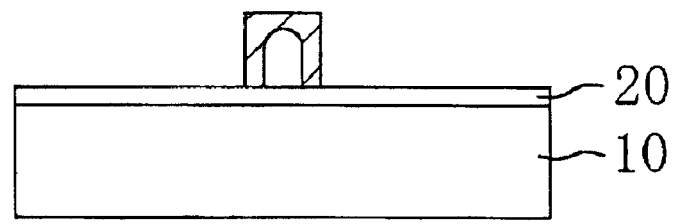

Referring to FIGS. 6A to 6C, the following is an explanation of another method for manufacturing a graded-index planar polymer waveguide in accordance with the present embodiment. FIGS. 6A to 6C are cross-sectional process diagrams of this polymer waveguide.

First, as shown in FIG. 6A, a film is formed by casting a fluorotoluene solution of polydiphenylfluoride siloxane onto an oxide film 20 formed on a silicon substrate 10, and by subsequently drying for one hour at 160° C. and then forming a fluorinated polysiloxane film 35, which is a fluorinated polymer matrix. The thickness of the fluorinated polysiloxane film 35 is for example 20 to 50 μm.

Then, as shown in FIG. 6B, the fluorinated polysiloxane film 35 is formed by photolithography and etching into a rectangular optical waveguide 41 with a cross-sectional side length of for example 15 μm.

Then, as shown in FIG. 6C, the silicon substrate 10 on which the optical waveguide 45 has been formed is immersed in a fluorotoluene solution of methyl (trifluoromethyl)siloxane trimers, which are fluorinated compatible molecules with a fluorine concentration that is higher than that of the fluorinated polysiloxane film 35, and then, the surface is swelled somewhat, thus adding (doping) these methyl(trifluoromethyl)siloxane trimers, obtaining a graded-index optical waveguide 45. In FIG. 6C, the hatched portion denotes the doped portion in the optical waveguide 45.

It is also possible to subsequently form an upper cladding layer covering the optical waveguide 45, as described above.

The cross section of the manufactured optical waveguide is rectangular, but the corner portions of this rectangle are doped with many co-oligomers with a high fluorine concentration, significantly decreasing the refractive index, so that the cross section of the optical waveguide becomes substantially close to being circular.

After the doping with the methyl(trifluoromethyl)siloxane trimers, the dopant molecules are reacted and immobilized by curing with electron beam irradiation. Thus, a stable graded-index optical waveguide can be obtained, and optical waveguides that are cured with electron beams have temporal changes that are only $\frac{1}{12}$ of those of optical waveguides that are not cured with electron beams.

Next, referring to FIGS. 7A to 7D, a method for manufacturing a step-index planar polymer waveguide in accordance with the present embodiment. FIGS. 7A to 7D are cross-sectional process diagrams of this polymer waveguide.

Figure 7A:
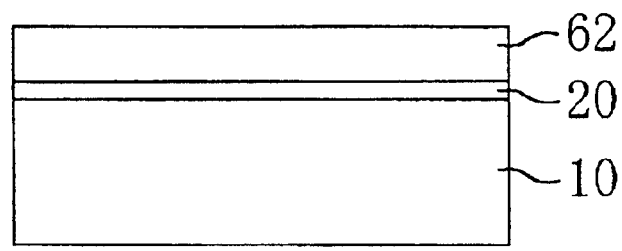
FIGS. 7A to 7D are cross-sectional process diagrams illustrating a method for manufacturing a step-index planar polymer waveguide in accordance with a third embodiment.

First, as shown in FIG. 7A, a film is formed by casting a dimethylacetoamide (DMAc) solution of (6FDA-ODA)

polyamic acid onto an oxide film 20 formed on a silicon substrate 10, and by subsequently drying for one hour at 160° C. and curing for one hour at 250° C., a lower cladding layer 62 made of a transparent fluorinated polyimide film is formed.

Figure 7B:
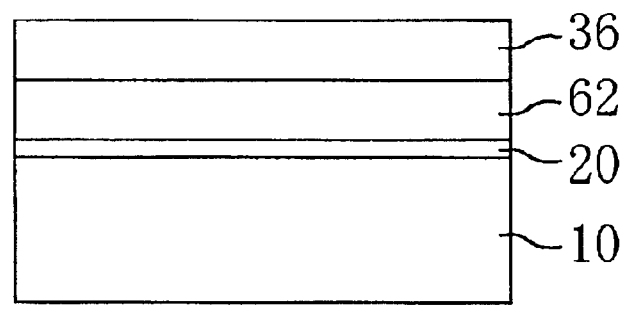

Then, as shown in FIG. 7B, a film is formed by casting a mixture of a dimethylacetoamide (DMAc) solution of (6FDA-ODA) polyamic acid and an N-methylpyrrolidone solution of (trifluoromethylmethacrylate vinylpyrrolidone (3:1)) co-oligomers, and by subsequently drying for one hour at 160° C., a fluorinated polyimide film 36, which is the fluorinated polymer matrix, is formed. The thickness of the fluorinated polyimide film 36 is for example 20 to 50 $\mu$m.

Figure 7C:
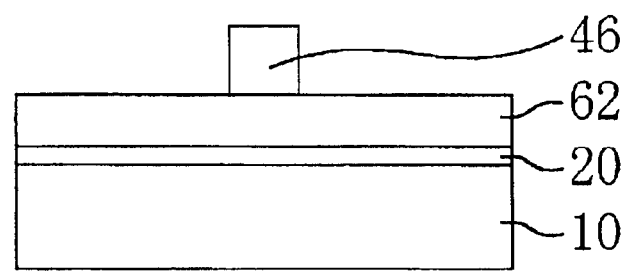

Then, as shown in FIG. 7C, the fluorinated polyimide film 36 is formed by photolithography and etching into a rectangular optical waveguide 46 with a cross-sectional side length of for example 15 $\mu$m.

Figure 7D:
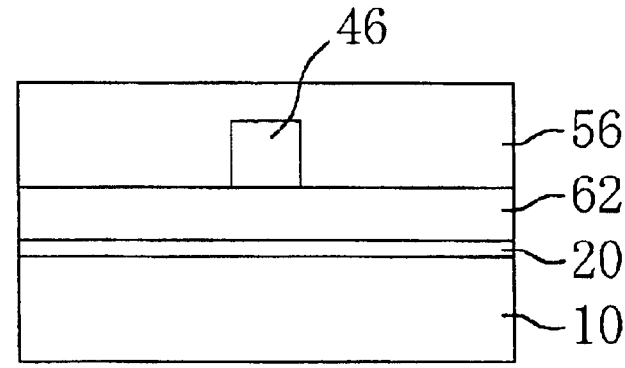
Figure 8A:
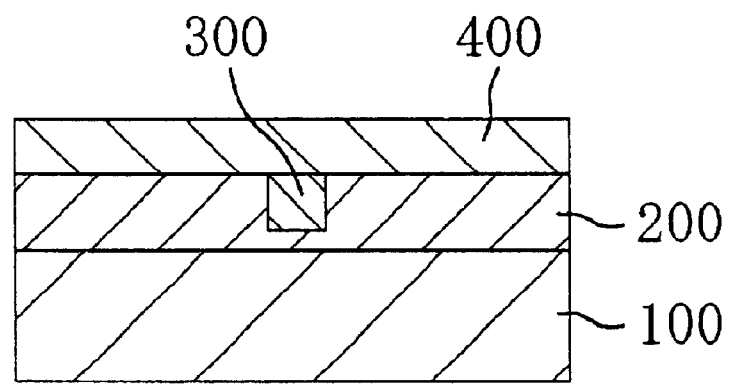
FIG. 8 is a cross-sectional view of a conventional planar optical waveguide.
Figure 8B:
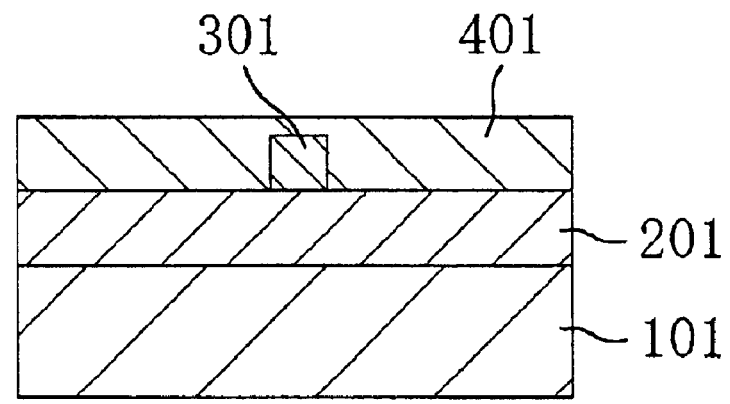

Then, as shown in FIG. 7D, a film is formed by casting a dimethylacetoamide (DMAc) solution of (6FDA-TFDB) polyamic acid on the optical waveguide 46, and by subsequent drying for one hour at 160° C. and curing for one hour at 250° C., an upper cladding layer 56 made of a transparent fluorinated polyimide film is formed.

Furthermore, 1% of solid 2,2'-bis (3,4-dicarboxyphenyl) hexafluoropropane is added to the mixture of the dimethylacetoamide (DMAc) solution of (6FDA-ODA) polyamic acid and the N-methylpyrrolidone solution of (trifluoromethylmethacrylate vinylpyrrolidone (3:1)) co-oligomers.

The resulting optical waveguide has good adhesiveness at the core/cladding interface, and stable optical waveguide properties.

With the present embodiment, a polymer optical waveguide is configured by adding, to a fluorinated polymer matrix, fluorinated compatible polymers whose fluorine concentration is higher than that of the fluorinated polymer matrix, so that the fluorinated compatible molecules enter the fluorinated polymer matrix and act as a plasticizer in the matrix, forming a solid solution and forming an amorphous molecular aggregate. Consequently, an polymer optical waveguide with uniform transparency and without optical dispersion that has excellent optical propagation properties can be obtained.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A planar optical waveguide, comprising:

a layered film formed on a substrate; and an optical waveguide core formed in said layered film;

wherein a cross section of said optical waveguide core is substantially quadrilateral;

wherein a dopant layer including refractive index-lowering molecules is provided around said optical waveguide core having a substantially quadrilateral cross section; and wherein said refractive index-lowering molecules included in said dopant layer are unevenly distributed in said optical waveguide core with a concentration that is higher toward outer sides and corners of said optical waveguide core, whereby a graded-index optical waveguide is constituted.

2. The planar optical waveguide according to claim 1, wherein said dopant layer is formed on said substrate; and wherein said optical waveguide core is formed on said dopant layer.

3. The planar optical waveguide according to claim 1, wherein said dopant layer is formed on an upper side of said optical waveguide core.

4. The planar optical waveguide according to claim 1, wherein said optical waveguide core comprises a polymer material;

wherein said refractive index-lowering molecules comprise fluorinated compatible molecules whose fluorine concentration is higher than that of said polymer material; and wherein said fluorinated compatible molecules are reacted with reactive groups included in said polymer material to immobilize said fluorinated compatible molecules by chemical bonding.

5. The planar optical waveguide according to claim 4, wherein said polymer material is at least one fluorinated polymer material selected from the group consisting of fluorinated polyimide, fluorinated polysiloxane and fluorinated polymethacrylate resins; and wherein said refractive index-lowering molecules comprise fluorinated compatible molecules whose fluorine concentration is higher than that of said fluorinated polymer material.

6. A method for manufacturing a planar optical waveguide, comprising:

(a) a step of forming a first dopant film including refractive index-lowering molecules on a substrate;

(b) a step of forming a thin film to serve as optical waveguide core on the substrate, and subsequently forming an optical waveguide core with substantially quadrilateral cross section by etching said thin film;

(c) a step of forming a second dopant layer including refractive index-lowering molecules on an upper side of said optical waveguide core with substantially quadrilateral cross section; and (d) a step of doping the refractive index-lowering molecules from said first and second dopant layers into said optical waveguide core with substantially quadrilateral cross section, whereby said refractive index-lowering molecules are distributed unevenly with a concentration that is higher toward outer sides and corners of said optical waveguide core.

7. The method for manufacturing a planar optical waveguide according to claim 6, wherein step (d) includes a thermal processing step.

8. The method for manufacturing a planar optical waveguide according to claim 6, wherein said refractive index-lowering molecules are fluorinated compatible molecules; and wherein, by at least one process selected from the group consisting of UV light processing, electron beam processing, plasma processing and thermal processing, a polymer material constituting said optical waveguide core is reacted with reactive groups included in said fluorinated compatible molecules, which are the refractive index-lowering molecules with which the optical waveguide core is doped, whereby said polymer material and said fluorinated compatible molecules are immobilized by chemical bonding.

9. A planar optical waveguide having an optical waveguide core, wherein said optical waveguide core is formed over a substrate;

wherein a low refractive index layer including refractive index-lowering molecules is formed around said optical waveguide core;

wherein said optical waveguide core includes said refractive index-lowering molecules at its periphery, and wherein said refractive index-lowering molecules are distributed with higher concentration toward the outer sides of said optical waveguide core.

* * * * *